(12) United States Patent
Yamamoto et al.

(10) Patent No.: US 8,336,954 B2
(45) Date of Patent: Dec. 25, 2012

(54) FEEDER APPARATUS FOR A SLIDE PANEL (75) Inventors: Masataka Yamamoto, Shizuoka (JP);
Keiji Mori, Shizuoka (JP); Takehiko Uehara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/929,376

(22) Filed: Jan. 20, 2011

(65) Prior Publication Data
US 2011/0175392 A1 Jul. 21, 2011

(30) Foreign Application Priority Data

Jan. 21, 2010 (JP) ................................ 2010-011370

(51) Int. Cl.
*B60J 7/043* (2006.01)
*H01R 13/46* (2006.01)

(52) U.S. Cl. .................. 296/216.04; 296/211; 296/213; 174/59; 174/542

(58) Field of Classification Search .................. 296/211, 296/213; 174/59, 542
See application file for complete search history.

(56) References Cited

U.S. PATENT DOCUMENTS

| 6,036,259 | A  | * | 3/2000 | Hertel et al. | 296/216.01 |
| 6,682,353 | B2 | * | 1/2004 | Bigotto | 439/34 |
| 6,997,499 | B2 | * | 2/2006 | Tsubaki et al. | 296/65.13 |
| 7,238,029 | B2 | * | 7/2007 | Tsubaki | 439/34 |

* cited by examiner

*Primary Examiner* — Dennis Pedder
(74) *Attorney, Agent, or Firm* — Edwards Wildman Palmer LLP; James E. Armstrong, IV; Stephen D. LeBarron (57) ABSTRACT There is provided a feeder apparatus for a slide panel so as to reduce the thickness of a panel of a car body the slide panel is attached to. The feeder apparatus 1 includes a wire harness 14 routed between a roof portion 2 and a sunroof 3, and a protector 15. The protector 15 includes a first protector 18 that is attached to rails 5a provided in the roof portion 2 and formed in the long-length shape parallel to the sliding direction of the sunroof 3 and accommodates one end portion 17a of the wire harness 14, and a second protector 2 that includes a protector body 26 slidably provided in the first protector 18 along the sliding direction of the sunroof 3 and a hook portion 27 the other end portion 17b of the wire harness 14 is attached to being attached to the sunroof 3.

6 Claims, 9 Drawing Sheets

FEEDER APPARATUS FOR A SLIDE PANEL

CROSS REFERENCE TO RELATED APPLICATIONS

The application is on the basis of Japanese Patent Application No 2010-11370, the contents of which are hereby incorporated by reference.

BACKGROUND OF THE INVENTION

1. Field of the Invention

The present invention relates to a feeder apparatus for a slide panel for electrically connecting electric devices such as a sunroof attached to the slide panel on a vehicle continually.

2. Description of the Related Art

A number of conventional feeder apparatus for a slide body have been employed to electrically connect electric devices continually such as a slide sheet in a vehicle and a sheet heater attached to a slide panel. It is also desirable that such a feeder apparatus for a slide body (refer to as a feeder apparatus for a slide panel, hereafter) employed in the vehicle described above, electrically connect photovoltaic panel, e.g., provided as a slide panel on a sunroof, under consideration of an environment, to electric devices provided in the vehicle continuously. It is desired in this case that a panel of a car body the sunroof is attached to be thinly formed.

The applicant of the invention proposes a feeder apparatus for a slide panel to resolve such a subject, comprising: a first protector that is formed in the gutter shape, and attached to the car body, and one end portion of a wire harness is attached to inside the bottom wall portion thereof; and a second protector that is formed in the gutter shape, and attached inside the bottom wall thereof, and the other end portion of the wire harness is attached to, and an opening thereof is arranged opposite to an opening of the first protector in cross section [Patent Document 1: JP. Application No. 2009-182176 (not published yet)].

A feeder apparatus for a slide panel shown in such a patent document 1 described above, however, is configured such that both the first protector and the second protector are overlapped under the sunroof, and openings of the protectors in cross section are configured to oppose each other along the thickness direction of the sunroof. Therefore it is finite to reduce the thickness of the panel of the car body a slide panel is attached to.

Accordingly, an object of the present invention is to provide a feeder apparatus for a slide panel so as to reduce the thickness of a panel of a car body a slide panel is attached to.

SUMMARY OF THE INVENTION

In order to attain the object, according to the present invention, there is provided a feeder apparatus for a slide panel comprising:

a wire harness routed between a car body and a slide panel that is slidably provided to the body, and operative in open and close of an opening provided through the body; and a protector accommodating the wire harness, wherein the protector comprising:

a housing member that is attached to the car body and formed in the long-length shape parallel to the sliding direction of the slide panel, and accommodates one end portion of the wire harness; and a slide member having a slid portion slidably provided in the housing portion along the sliding direction of the slide panel and an attachment portion that the other portion of the wire harness is attached to and is attached to the slide panel.

According to the present invention having such a feature, since the slide member slidably provided in the housing member in the long-length shape has the attachment portion that is attachable to the slide panel, the slide member of the protector is not overlapped under the slide panel. Therefore, the thickness of the panel of the car body the slide panel is attached to can be reduced.

Preferably, the feeder apparatus for a slide panel further comprises:

a columnar member that is provided in the slide panel parallel to the perpendicular direction to the sliding direction of the slide panel, and the attachment portion is hooked to.

According to the present invention having such a feature, since the slide member is attached to the slide panel by hooking the attachment portion of the slide member to the columnar member provided in the slide panel, the columnar member relatively rotates about the attachment portion when the slide panel tilts up. Therefore, the protector can be prevented destruction resulted from a stress between the housing member and the slide member.

Preferably, the housing member is formed in the gutter shape, and the slid portion of the slide member is formed in gutter shape to accommodate the other end portion of the wire harness, and openings in cross section of the housing member and the slid portion are arranged oppositely along a surface of the slide panel.

According to the present invention having such a feature, since the housing member in the gutter shape and the slid portion of the slide member in the gutter shape are arranged such that the openings in cross section oppose each other along the surface of the slide panel, the thickness of the protector can be reduced, and a step can be prevented from being formed inside the members. Therefore, the thickness of the panel the slide panel is attached to can be reduced, and it is preventable the step would otherwise interfere with the wire harness and damage it described above.

Preferably, the protector further comprises:

a rail portion that is provided in one of the housing member or the slid portion of the slide member, and extends along in the sliding direction of the slide panel; and a slider portion that is provided in the other of the housing member or the slid portion of the slide member, and positioned inside the rail portion with the inside thereof in contact.

According to the present invention having such a feature, since the slide member is slidably attached to the housing member by the rail portion and slider portion, which contact each other, the slide member can be prevented from hooking to the housing member not to slide while being pushed and pulled by the slide panel. Therefore, the feeder apparatus for a slide panel secures the slide panel to slide.

Preferably, the housing member is formed in the tube shape with a slit extending along the sliding direction of the slide panel, and the slid portion is accommodated in the housing member. In addition, the attachment portion of the slide member is positioned outside the housing member by passing through the slit, and formed in the flat-board shape.

According to the present invention having such a feature, since the housing member is formed in the tube shape provided with the slit, and the slid portion of the slide member is positioned inside the housing member, and the attachment portion is formed in the flat-board shape to pass through the slit, the housing member and the slide member are not overlapped each other in the thickness direction of the slide panel. Therefore, the thickness of the protector can be reduced, and the step can be prevented from being formed inside the housing member. Therefore, the panel the slide panel is attached to can be reduced, and it is preventable the step would otherwise interfere with the wire harness and damage it described above.

Preferably, the protector further comprises:
a rail portion that is provided between the slid portion of the slide member and the attachment portion, and positions a circumference of a slit of the housing member inside with the inside thereof in contact.

According to the present invention having such a feature, since the protector comprises the rail that positions housing member inside with the inside thereof in contact, and the slide member is slidably attached to the housing member by the rail, the slide member can be prevented from hooking to the housing member not to slide while being pushed and pulled by the slide panel. Therefore, the feeder apparatus for a slide panel secures the slide panel to slide.

Preferably, the protector further comprises:
a remedying portion that is arranged at an end portion away from the attachment portion of the slid portion with thickness thereof gradually increasing as separated from the attachment portion, and the end surface thereof away from the attachment portion is formed in the convex round shape.

According to the present invention having such a feature, since the remedying portion contacts the wire harness in the housing member when the slide member slides, the remedying portion remedies the wire harness to prevent twisting in the housing member.

These and other objects, features, and advantages of the present invention will become more apparent upon reading of the following detailed description along with the accompanied drawings.

DETAILED DESCRIPTION OF THE PREFERRED EMBODIMENTS

First Embodiment

A feeder apparatus for a slide panel (hereafter, simply referred to as a feeder apparatus) according to a first embodiment of the invention shown in FIG. 1 is described with reference to FIG. 1 to FIG. 9. It is noted that a feeder apparatus referred to as in the invention shows a system not only for continuously supplying power to devices provided in a slide panel such as a sunroof 3 (shown in FIG. 1) slidably provided on a car body such as a roof portion 2 (shown in FIG. 3) but also for electrically connecting devices in the car body to devices provided in the slide panel continuously.

The feeder apparatus is attached to a vehicle including a roof portion 2 (shown in FIG. 3) as a panel of a car body and a sunroof 3 as a slide panel slidably provided in the roof portion 2 shown in FIG. 1.

Figure 2A:
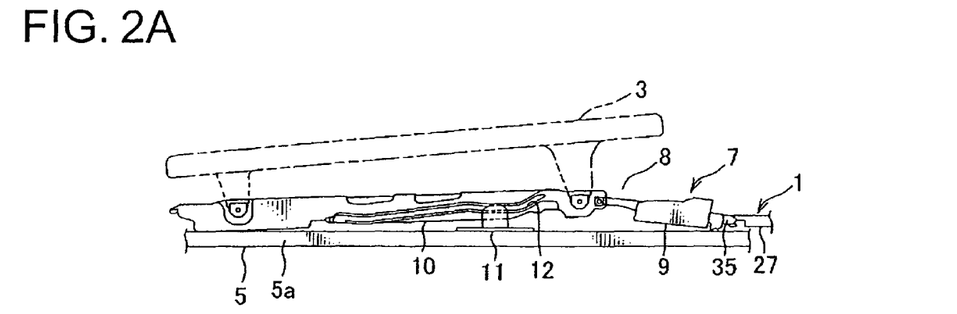
FIG. 2A is an explanatory drawing showing a state from the side in which the car sunroof is positioned in the full-closed position shown in FIG. 1A.
Figure 2B:
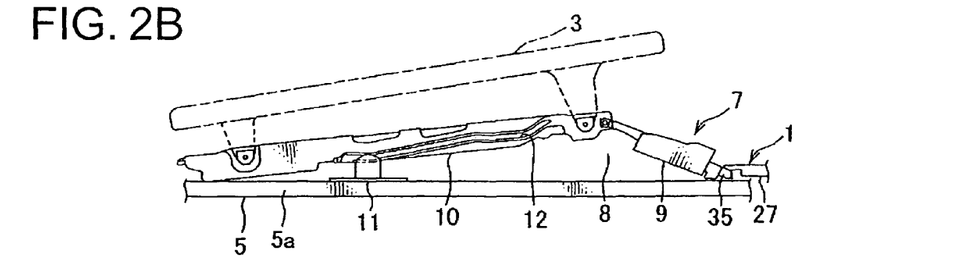
FIG. 2B is an explanatory drawing showing a state from the side in which the car sunroof shown in FIG. 1A is positioned in the tilt-up position.
Figure 2C:
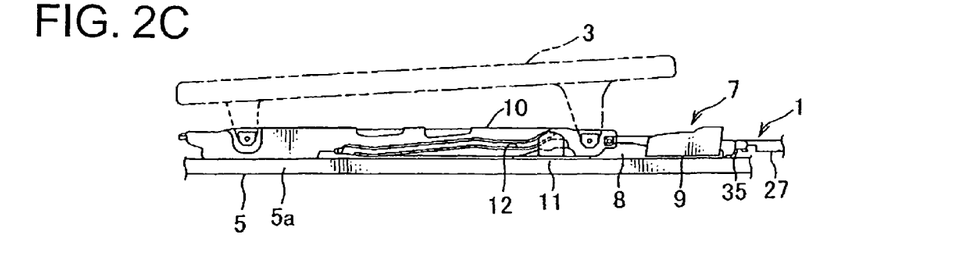
FIG. 2C is an explanatory drawing showing a state from the side in which the car sunroof shown in FIG. 1A is positioned in the tilt-down position.
Figure 3:
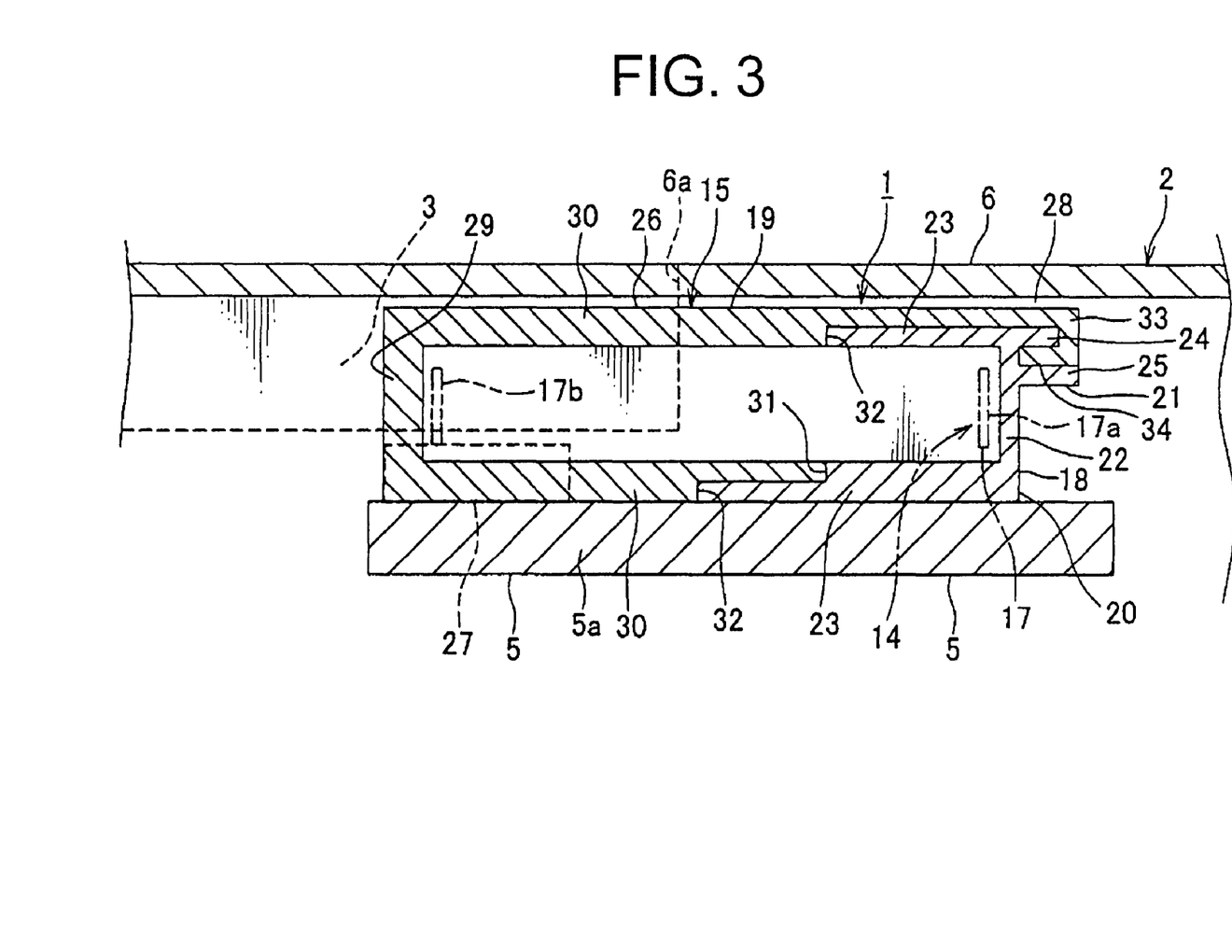
FIG. 3 is a sectional view showing a construction of principal parts in the feeder apparatus for a slide panel shown in FIG. 1A and FIG. 1B.

The roof portion 2 includes a roof panel 6 configuring a roof of a crew cabin in the vehicle as shown in FIG. 3. The roof panel 6 is provided with an opening 6a therethrough. The roof panel 6 is attached to a sliding structure 7 (partly shown in FIG. 2A to FIG. 2C) that moves the sunroof 3 toward fore and aft of the vehicle to open and close the opening 6a, and also rotates upward the sunroof 3 with the opening 6a closed about the front end portion of the vehicle.

Figure 1A:
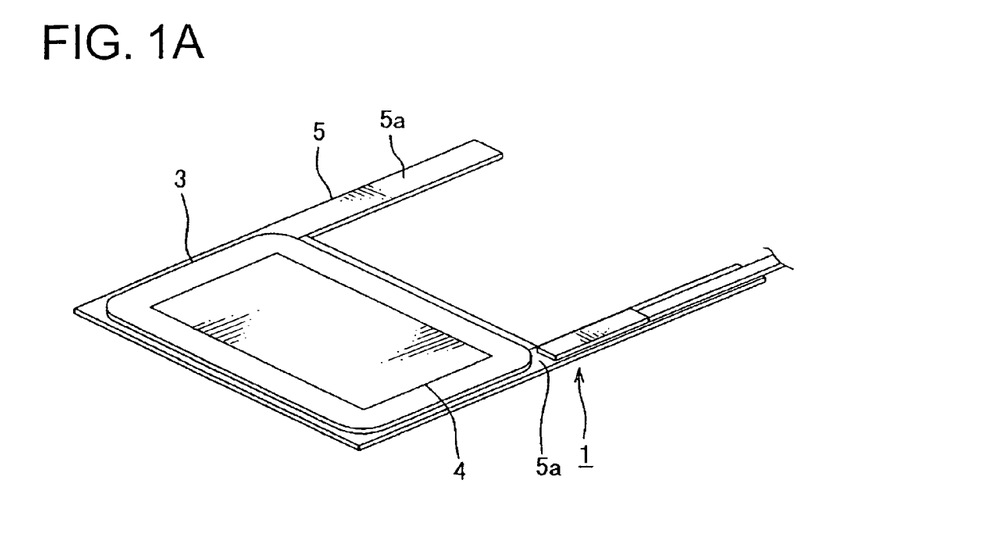
FIG. 1 is a perspective view showing a construction of principal parts wherein a car sunroof employing a feeder apparatus for a slide panel is positioned in the full-closed position according to a first embodiment.
Figure 1B:
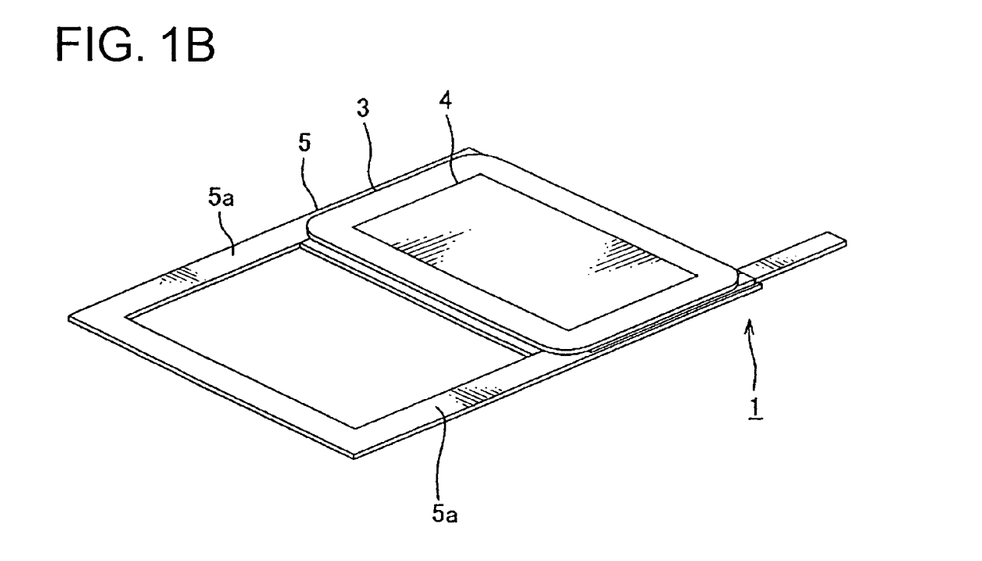
FIG. 1B is a perspective view showing a construction of principal parts wherein the car sunroof employing the feeder apparatus shown in FIG. 1A for a slide panel is positioned in the full-open position.

The slide structure 7 includes a frame 5 shown in FIG. 1 and a panel movement portion 8 slidably provided on a rails 5a of the frame 5 in the longitudinal direction of the rails 5a. The frame 5 is attached to the crew cabin side of the roof panel 6, and includes a pair of rails 5a parallel to the fore and oft direction of the vehicle as shown in FIG. 1A and FIG. 1B. The rails 5a are provided where the opening 5 is positioned.

The panel movement portion 8 includes a gutter 9, a pair of function brackets 10 (one side thereof shown in FIG. 2A to FIG. 2C), and a pair of slide shoes 11 (one side thereof shown in FIG. 2A to FIG. 2C) as shown in FIG. 2A to FIG. 2C. The gutter 9, the pair of brackets 10 and the pair of slide shoes 11 are slidably provided on the rails 5a in the longitudinal direction thereof.

The gutter 9 is formed in the gutter shape with its longitudinal direction parallel to the width direction of the vehicle, and both longitudinal end portions are slidably supported on the rails 5a. The gutter 9 moves toward fore and aft of the vehicle on the rails 5a by a drive source (not shown). Further, an edge portion of the gutter 9 backward the vehicle is rotatively supported by the rails 5a. Note that the gutter 9 rotates about an axis parallel to the width direction of the vehicle.

Each of the pair of function brackets 10 is formed in the long-length shape and arranged inside the pair of rails 5a, and provided parallel to the fore and aft direction of the vehicle spaced each other. A rear end of the function brackets 10 is rotatively connected with an edge of the gutter 9 frontward the vehicle. A front end of the function brackets 10 is rotatively supported by the rails 5*a*. Note that the function brackets 10 rotate about an axis parallel to the width direction of the vehicle. Further the center portion of the function brackets 10 is provided with a slit 12 extending in the longitudinal direction of the function brackets 10. The slit 12 gradually inclines in the fore and aft direction of the vehicle toward inside the crew cabin as approaching the front of the vehicle. Further, the function brackets 10 are attached to the sunroof 3.

The slide shoes 11 move toward fore and aft of the vehicle on the rails 5*a* by a drive source (not shown) other than that for the gutter 9. The slide shoes 11 include a projection (not shown) intruding into the slit 12 and sliding therein.

According to the configuration described above, the slide structure 7 positions the sunroof 3 in the opening 6*a* by positioning a slide panel 8 forward vehicle. The slide structure 7 then positions the projection of the slide shoes 11 in the center of the slit 12 of the function brackets 10 as shown in FIG. 2A so that the sunroof 3 is positioned in the full-closed position (shown in FIG. 1A) where the sunroof 3 closes up the opening 6*a*. The outside surface of the sunroof 3 and that of the roof panel 6 are approximately the same surface in the full-closed position.

The slide structure 7 moves the slide shoes 11 forward by the drive source with the panel movement portion 8 positioned forward, as shown in FIG. 2B, so that it positions the sunroof 3 in the tilt-up position where the rear end of the function brackets 10, i.e., the rear end of the sunroof 3 projects upward. Further, the slide structure 7 moves the slide shoes 11 backward by the drive source with the panel movement portion 8 positioned forward, as shown in FIG. 2C, so that it positions the sunroof 3 in the tilt-down position where the rear end of the function brackets 10, i.e., the rear end of the sunroof 3 sinks downward. The slide structure 7 then moves the gutter 9 and the slide shoes 11 together backward in the tilt-down position, and positions the sunroof 3 and the like under the roof panel 6 in the full-open position (shown in FIG. 1B) where the sunroof 3 opens the opening 6*a*. As described, the slide structure 7 moves the gutter 9 and the slide shoes 11 together toward fore and aft with the rear end of the sunroof 3 sinking downward so that the sunroof 3 can open and close the opening 6*a*. Also as described, the slide structure 7 moves the slide shoes 11 toward fore and aft in the position where the panel movement portion 8 is positioned in the opening 6*a* to switch either the tilt-up position or the tilt-down position.

The sunroof 3 is formed in the flat-board shape. A photovoltaic panel 4 as an electric device is attached to the sunroof 3, as shown in FIG. 1.

The feeder apparatus 1 is arranged on one of the rails 5*a* of the frame 5 as shown in FIG. 1A and FIG. 1B. The feeder apparatus 1 includes a wire harness 14 routed between the protector portion 2 and the sunroof 3, a protector 15, and a columnar member 16 (shown FIG. 7), as shown in FIG. 3 and FIG. 5 and the like.

The wire harness 14 is configured with a flexible flat cable 17 (hereafter referred to as FFC) as a flat electric circuit. The FFC 17 includes a plurality of conductors (not shown) and a pair of isolation sheets covering the conductors. The conductors are formed in the rectangle shape in cross section and linearly extending. The plurality of conductors is aligned parallel to each other.

The isolation sheets are made of a synthetic resin with isolation properties and formed in the belt shape. The isolation sheets sandwich a plurality of conductors there within and cover the conductors. The conductors and the isolation sheets are flexible. The FFC 17 includes the conductors and the isolation sheets and is formed in the flat-belt shape. What is called the flat electric circuit body herein includes a plurality of parallel conductors and isolation sheets covering the conductors and is formed in the flat-belt shape.

Figure 4:
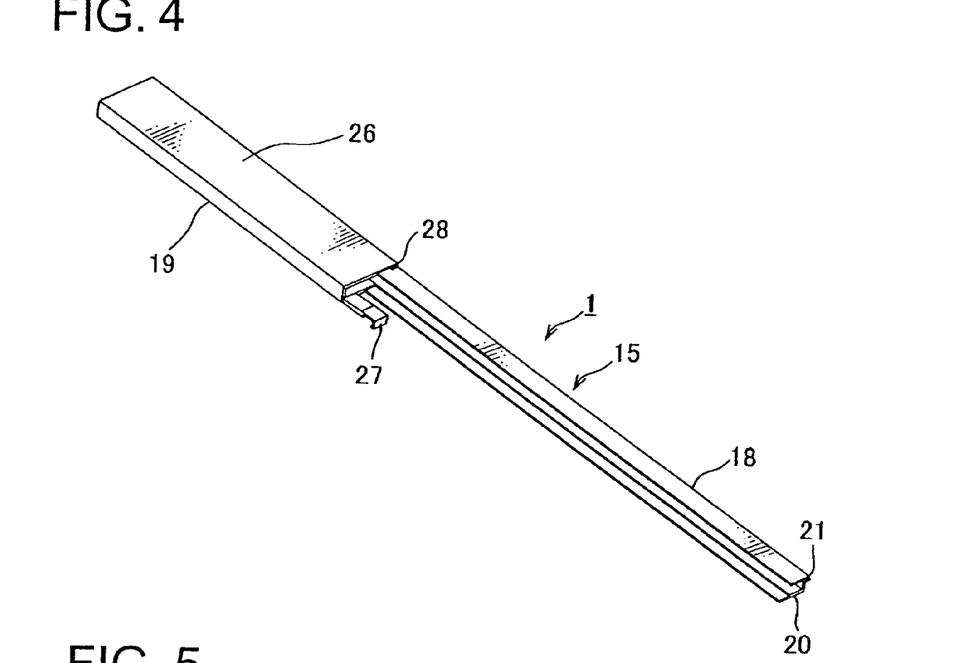
FIG. 4 is a perspective view showing a protector in the feeder apparatus for a slide panel shown in FIG. 1B in the full-open position.
Figure 5:
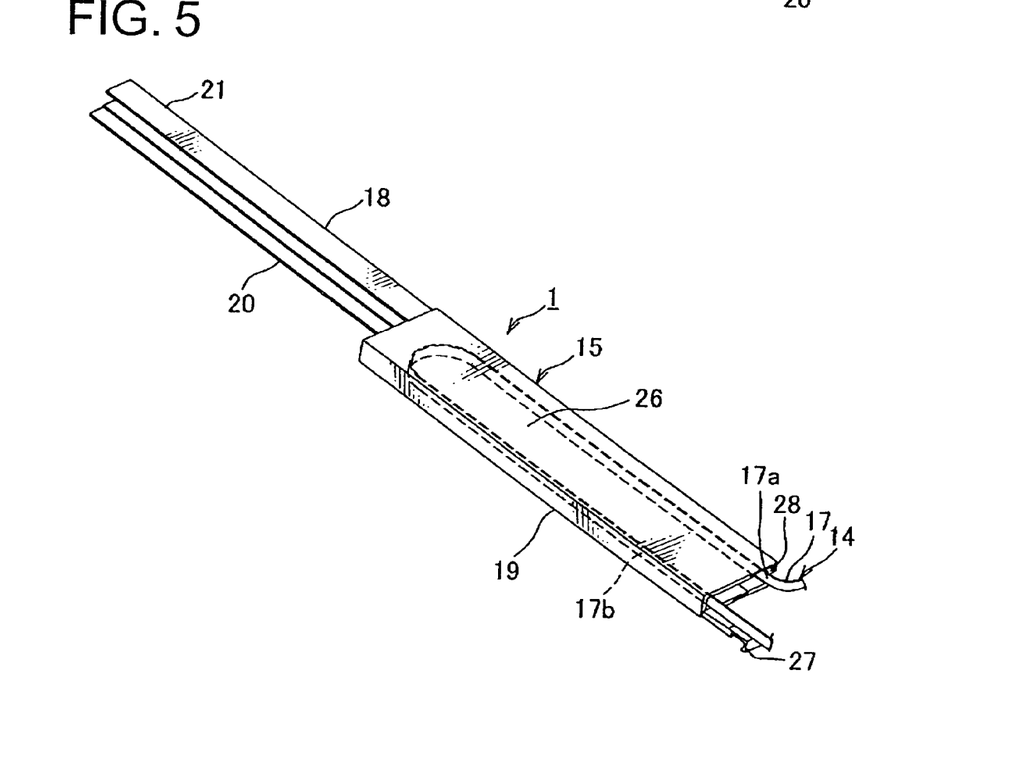
FIG. 5 is a perspective view showing the protector in the feeder apparatus for a slide panel shown in FIG. 1A in the full-closed position.

A protector 15 includes a first protector as a housing member and a second protector 19 as a slide member as shown in FIGS. 3, 4 and 5. The first protector 18 is made from a synthetic resin with isolation properties, and formed in the long-length shape linearly extending, and arranged in the longitudinal direction parallel to the fore and aft direction of the vehicle, i.e., the sliding direction of the sunroof 3. Further, the first protector 18 is arranged backward the sunroof 3 in the full-closed position on the one side of the rails 5*a*, and attached to the one side of the rails 5*a*.

The first protector 18 includes a gutter-shaped protector 20 and rail portion 21 integrally. The protector body 20 includes a belt-shaped bottom wall portion 22 and a pair of stand walls 23 standing from both edges of the width direction of the bottom wall portion 22. One of the stand walls 23 located downward a pair of stand walls 23 (shown in FIG. 3) is laid on the one side of the rails 5*a* of a frame 5 on the vehicle and attached to the one of the rails 5*a*.

The rail portion 21 is provided across the total length of the protector body 20, and linearly extending along the longitudinal direction of the protector body 20. The rail portion 21 includes a first flange 24 projecting from the other stand wall 23 in the direction away from the sunroof 3 and a second flange 25 projecting from the central side of the bottom wall portion 22 in the direction away from the sunroof 3 with a space to the first flange 24. Each of the first flange 24 and the second flange 25 linearly extends along the longitudinal direction of the protector 20.

Because the stand wall 23 is attached to the one side of the rails 5*a*, an opening in cross section of the first protector 18 is arranged opposite to the sunroof 3 in the full-open position.

The second protector 19 is made from a synthetic resin with isolation properties, and linearly extends, and is formed shorter than the first protector 18. The second protector 19 includes a gutter-shaped protector body 26 as a slid portion, a hook portion 27 as an attachment portion, and a slider portion 28 integrally.

The protector body 26 includes a band-plate-shaped bottom wall portion 29, a pair of stand walls 30 standing from the both edges in the width direction of the bottom wall portion 29, and is formed in the gutter shape. In the protector body 26, the bottom wall 29 opposes a bottom wall portion 22 of the protector body 20 of the first protector 18 with a space, and one of a pair of stand walls 30 is arranged to be laid on the one side of the rails 5*a* such that the one of a pair of stand walls 30 and the one of the stand portion 23 of the protector body 20 of the first protector 18 have the same surface.

In this way, since the bottom wall portion 22 is arranged to have a space to the bottom wall portion 29, an opening of the protector body 26 of the second protector 19 in cross section is arranged opposite to an opening of the first protector 18 in cross section along the surface of the sunroof 3. In addition, the longitudinal direction of the protector body 26 of the second protector 19 is parallel to the sliding direction of the sunroof 3.

A step 31 and a step 32 slidably engaging each other are provided such that the inside surface of the stand wall 23 of the protector body 20 of the first protector 18 and that of the stand wall portion 30 of the protector body 26 of the second protector 19 have the same surface.

Figure 6:
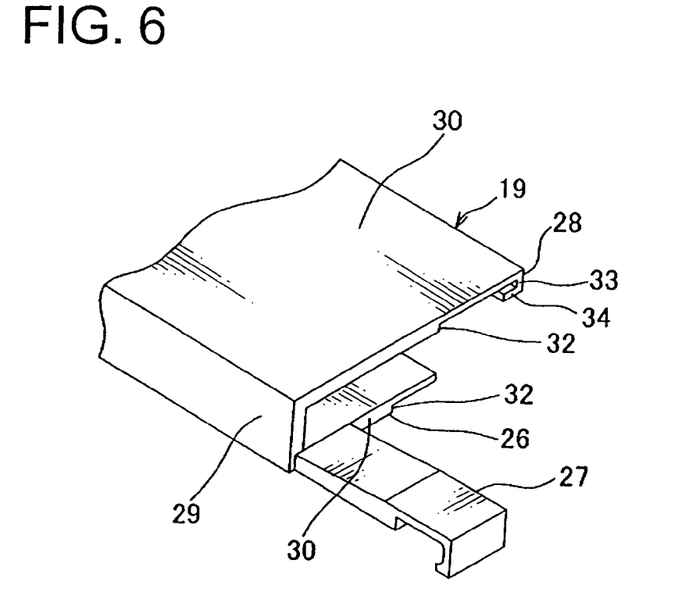
FIG. 6 is a perspective view enlarging about a hook portion of a second protector of the protector shown in FIG. 5.

A hook portion 27 is provided at the end face of the protector body 26 of the second protector 19 on the forward side of the vehicle as shown in FIG. 6. The hook 27 projects from one of the stand walls 30 near the bottom wall 29 at the end face of the protector body 26 toward the front of the vehicle, i.e., the sunroof 3. A tip of the hook 27 is formed in the hooked shape. The hook 27 is hooked to a columnar member 16 so that the second protector 19 is attachable to the gutter 9, i.e., sunroof 3. Note that the inside surface of the hook portion 27 has a clearance against the circumstance surface of the columnar member 16 even when the hook 27 is hooked to the columnar member 16. Therefore, the hook 27 is rotative to the columnar member 16 while hooked thereto.

A slider portion 28 is provided across the total length of the protector body 26 and linearly extends along the longitudinal direction of the protector body 26. The slider portion 28 is provided at a tip of the other of the stand walls 30 far from the bottom wall portion 29, and includes integrally a parallel portion 33 extending from the tip toward one of the stand walls 30 parallel to the other of the bottom walls 29 and a perpendicular portion 34 extending from a tip of the parallel portion 33 toward the bottom wall portion 29, and is formed in the hooked shape in cross section. The slider portion 28 closely contacts with the inside surface of the rail portion 21 as shown in FIG. 3, and is positioned inside the rail portion 21 so that it is slidable on the inside surface of the rail portion 21. Note that there is no clearance between the rail portion 21 and the slider portion 28 in the illustrated example.

The second protector 19 is slidably attached to the first protector 18 along the longitudinal direction of the first protector 18, i.e., the sliding direction of the sunroof 3 by the steps 31, 32 and slider portion 28 described above.

The FFC 17 described above is arranged such that both one end portion 17a and the other end portion 17b are positioned forward the vehicle as shown in FIG. 5, and central part thereof is positioned backward the vehicle, and that the one end portion 17a is stacked inside the end portion of the bottom wall portion 22 of the first protector 18 forward the vehicle and attached to the bottom wall portion 22 and accommodated in the protector body 20 of the second protector 18. The other end portion 17b of the FFC 17 is stacked on the inside of the end portion the bottom wall portion 29 of the first protector 19 forward the vehicle, and stacked above the hook portion 27, and attached to the second protector 19, and accommodated in the protector body 26 of the second protector 19. Note that the one end portion 17a corresponds to the one end portion of a wire harness 14 in the claims, and the other end portion 17b the other end portion thereof.

Further, the one end portion 17a of the FFC 17 is connected to devices in the car body of the vehicle. The other portion 17b of the FFC 17 is connected to a photovoltaic panel as a device of sunroof 3 on the vehicle.

Figure 7:
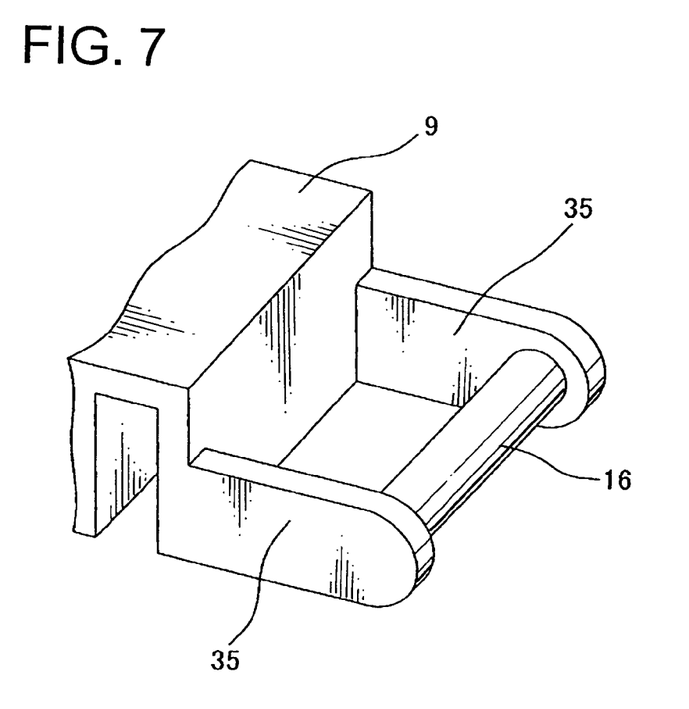
FIG. 7 is a perspective view enlarging a columnar member in the feeder apparatus for a slide panel shown in FIG. 1A and FIG. 1B.
Figure 8:
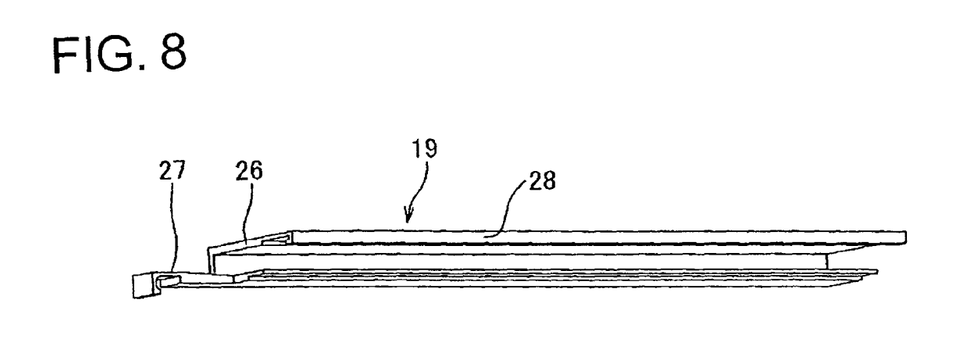
FIG. 8 is a perspective view of a second protector in the feeder apparatus for a slide panel shown in FIG. 1A and FIG. 1B.
Figure 9:
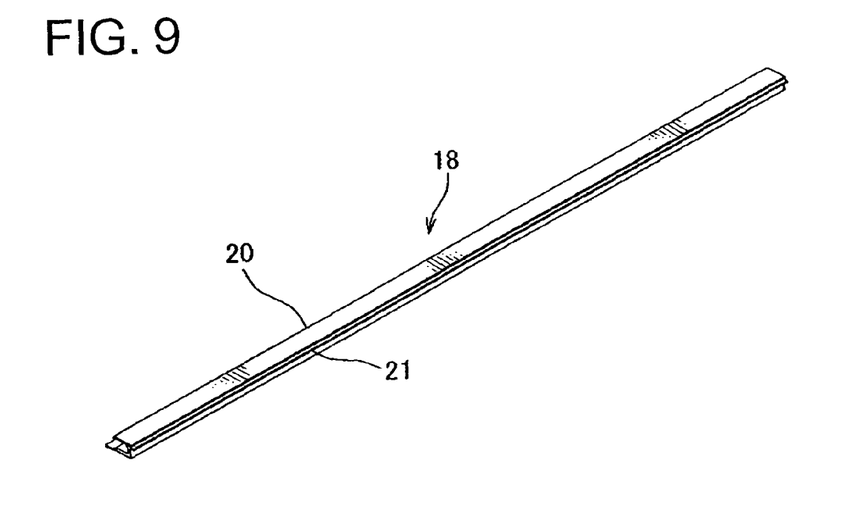
FIG. 9 is a perspective view of a first protector in the feeder apparatus for a slide panel shown in FIG. 1A and FIG. 1B.

The columnar member 16, as shown in FIG. 7, is provided in a portion of the gutter 9 near the protector 15 integrally. Namely, the columnar member 16 is provided in the gutter 9, i.e., therethrough the sunroof 3 attached to the function brackets 10 of the panel movement portion 8. An axis of the columnar member 16, as shown in FIG. 7, is formed in the columnar shape perpendicular to the sliding direction of the sunroof 3, and both end portions thereof are supported with a pair of stand pieces 35 standing from the gutter 9. The columnar member 16 is hooked to the hook 27.

In the feeder apparatus 1 configured as described above, the FFC continuously connects devices in the car body with the photovoltaic panel 4 of the sunroof 3, and the hook portion 27 thereof is hooked to the columnar member 16 to be attached to the gutter 9, i.e., the sunroof 3 therethrough. When the feeder apparatus 1 moves between the full-closed position where the sunroof 3 closes up the opening 6a and the full-open position where the sunroof 3 opens the sunroof 3, the second protector 19 slides toward the fore and aft direction of the vehicle, following the gutter 9, i.e., the sunroof 3, as shown in FIGS. 4 and 5 as the feeder apparatus 1 is pushed or pulled by the gutter 9, i.e., the sunroof 3 because the hook portion 27 is hooked to the columnar member 16. Additionally, the columnar member 16 rotates inside the hook portion 27 because the hook portion 27 and the columnar member 16 are rotative while the sunroof 3 tilts up. The hook portion 27 thus keeps the attitude constant not to generate unnecessary stress between the first protector 18 and the second protector 19 while the sunroof 3 tilts up or tilts down.

When the feeder apparatus 1 moves between the full-closed position where the sunroof 3 closes up the opening 3 and the full-open position where the sunroof 3 opens the sunroof 3, the FFC keeps contact with the inside of the first protector 18 and the second protector 19 due to the flexibility thereof. According to the present invention, since the hook portion 27 attachable to the sunroof 3 is provided in the second protector 19 slidably provided in the first long-length-shaped protector 18 of the protector 15, the second protector 19 of the protector 15 is not overlapped under the sunroof 3. Therefore, the thickness of the roof panel 6 as a panel of the roof portion 2 on the car body the sun roof 3 is attached to can be reduced.

Further, since the columnar member 16 provided in the sunroof 3 is hooked to the hook portion 27 of the second protector 19 so that the second protector 19 is attached to the sunroof 3, the columnar member 16 relatively rotates against the hook portion 27 while the sunroof 3 tilts up. Therefore, destruction resulted from a stress between the first protector 18 and the second protector 19 can be prevented while the sunroof 3 tilts up.

Since the protector 20 of the first gutter-shaped protector 18 and the protector body 26 of the second gutter-shaped protector 19 are arranged as the openings thereof in cross section oppose each other along the surface of the sunroof 3, the thickness of the protector 15 can be reduced, and a step can be prevented to be formed inside the protector 18 and 19. Therefore, the thickness of the panel the slide panel is attached to can be reduced, and it is preventable the wire harness would be otherwise interfered with the step and damaged, which would be resulted from the step inside the members described above.

Since the second protector 19 is slidably attached to the first protector 18 by the rail portion 21 and slider portion 28 that contact each other, the second protector 19 is guided toward the sliding direction thereof, and can be prevented from hooking to the protector 18 and not sliding when the second protector 19 slides while being pushed and pulled by the sunroof 3. The feeder apparatus 1 thus secures the sunroof 3 to slide. According to the first embodiment described above, the first protector 18 is provided with the rail portion 21, and the second protector 19 the slider portion 28. In the invention, the second protector 19 may be provided with rail portion 21, the first protector 18 the slider portion 28.

Second Embodiment

Subsequently, a feeder apparatus 1 according to a second embodiment of the invention is explained with reference to FIG. 10 to FIG. 14. Note that the same part in the first embodiment described above is given the same symbol to be explained.

As the feeder apparatus 1 in the embodiment is different from that in the first embodiment in the protector 15 described above, and similar to in the others, a protector 15 in the embodiment is explained hereafter.

Figure 10:
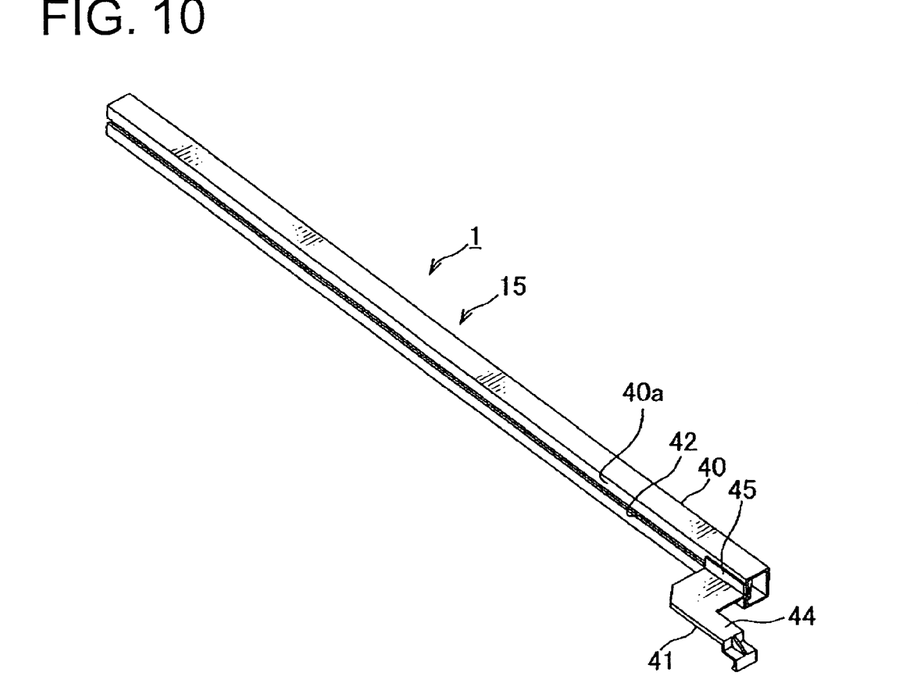
FIG. 10 is a perspective view showing a protector in a feeder apparatus for a slide panel according to a second embodiment.
Figure 11:
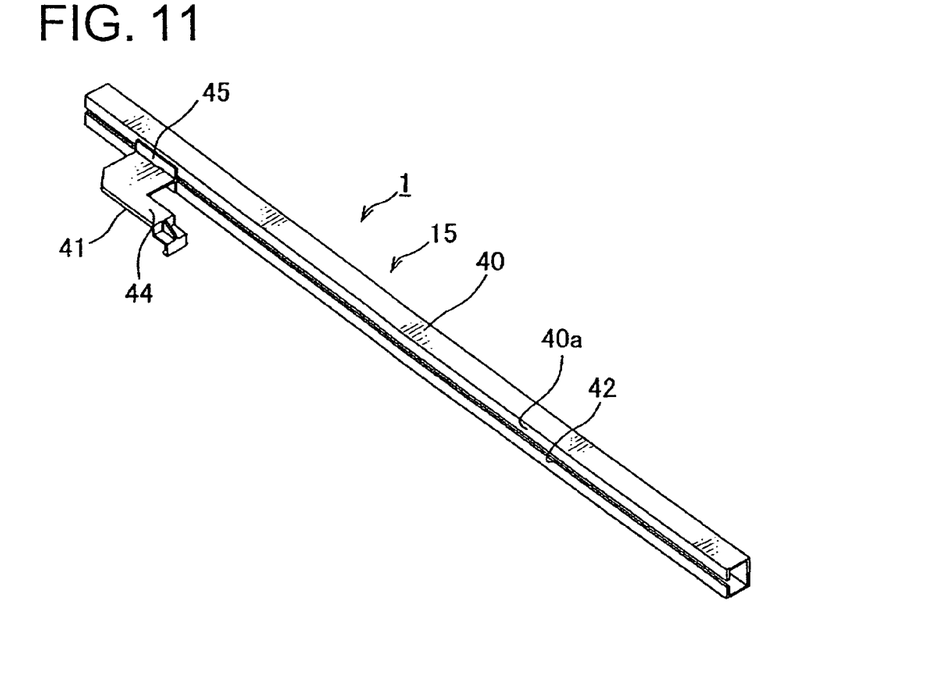
FIG. 11 is a perspective view showing the protector in the full-open position shown in FIG. 10.
Figure 12:
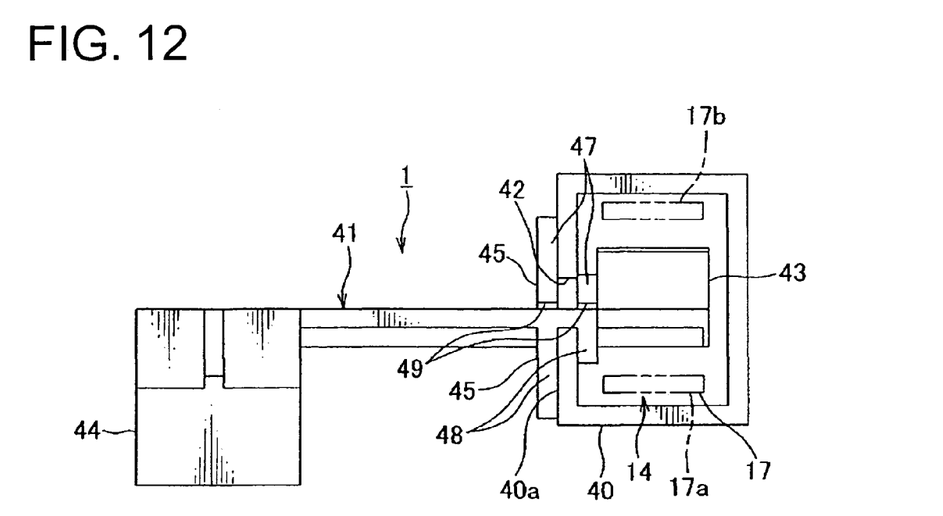
FIG. 12 is a front view showing the protector shown in FIG. 10.

The protector 15 of the feeder apparatus 1 in the embodiment includes a protector body 40 as a housing member and a slider 41 as a sliding member as shown in FIGS. 10, 11 and 12. The protector 40 is made from an synthetic resin with isolation properties, and formed in the long-length shape linearly extending, and arranged with its longitudinal direction parallel to the fore and aft direction of the vehicle, i.e., the sliding direction of the sunroof 3. The protector body 40 is arranged on one of the rails 5a backward the sunroof 3 in the full-closed position.

The protector body 40 is formed in the square-tube shape with a slit 42 in a wall surface 40a toward the other side of the rails 5a as shown in FIG. 10 and FIG. 11. The slit 42 is provided with the protector body 40 across the total length thereof to naturally pass through the wall surface 40a. Additionally, the slit 42 linearly extends along the fore and aft direction, i.e., the sliding direction of the sunroof 3.

Figure 13:
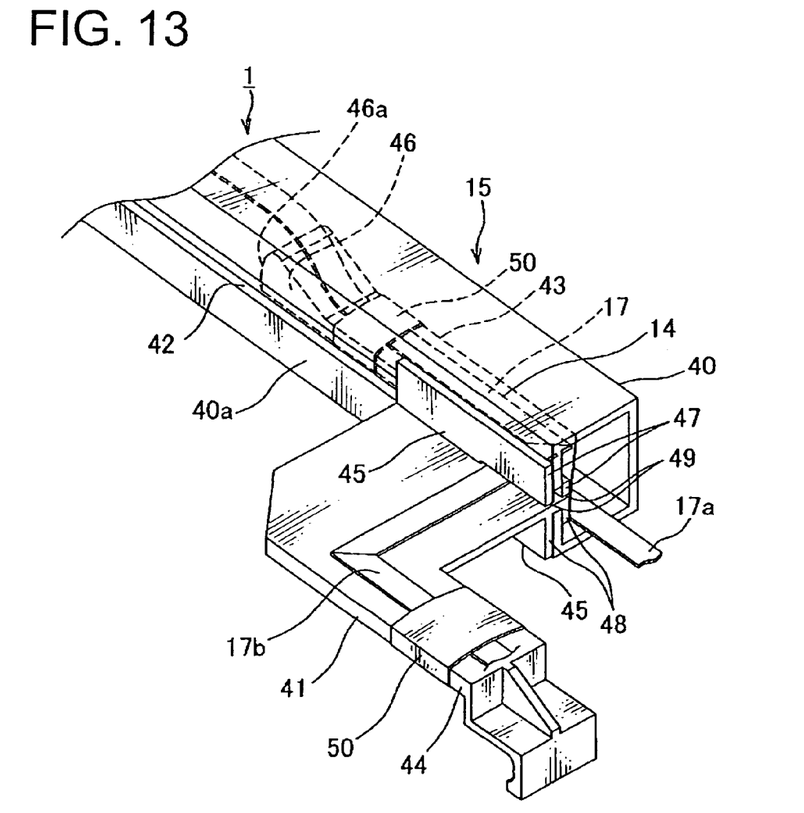
FIG. 13 is a perspective view enlarging about the slider of the protector shown in FIG. 11.
Figure 14:
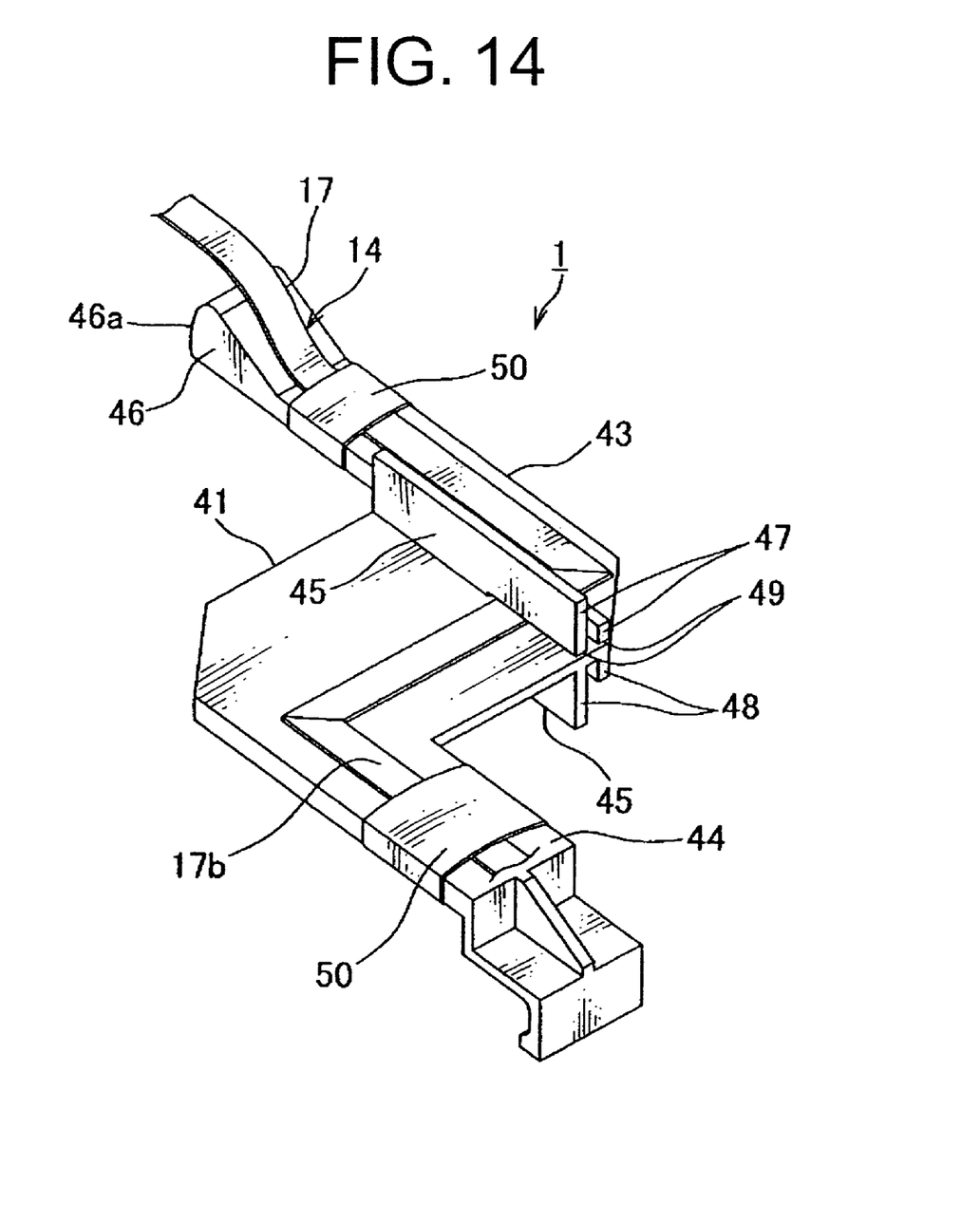
FIG. 14 is a perspective view showing the slider of the protector shown in FIG. 10.

The slider 41 is formed in the flat-plate shape across the total length thereof as shown in FIGS. 12 to 14, and includes a slid portion 43, a hook portion 44 as an attachment portion and a pair of rail portions 45 integrally. Both the surfaces of the slid portion 43 are formed in the thicker flat-plate shape parallel to the surface of the sunroof 3 and accommodated in the protector body 40.

Further, the slid portion 43 includes integrally a remedying portion 46 at the end portion located in the back side in FIG. 14 apart from the hook portion 44. The remedying portion is formed with its thickness gradually increasing as separated from the hook portion 44, and with the end surface 46a thereof away from the hook portion 44 in the convex round shape.

The hook portion 44 first stands from the slid portion 43 along the width direction of the vehicle toward the sunroof 3 and then extends frontward the vehicle, and is formed in the flat-panel shape thinner than the slid portion 43. The hook portion 44 is formed with the thickness thereof thinner than the width of the slit 42, and positioned outside the protector body 40 from the slid portion 43 through the slit 42. The hook portion 44 is hooked to the columnar member 16, and attached to the gutter 9, i.e., the sunroof 3.

Each of a pair of rail portions 45 is provided between the sliding portion 43 and the hook portion 44. One of the rail portions 45 includes a pair of stand walls 47 standing from one surface thereof spaced each other between the slid portion 43 and the hook portion 44, and the other of the rail portions 45 includes a pair of stand walls 48 standing from the other surface thereof spaced each other between the slid portion 43 and the hook portion 44. The stand walls 47 and 48 each linearly extends along the sliding direction of the sunroof 3. A space between the stand walls 47 and 48 is almost equal to the thickness of the wall surface 40a the slit 42 is provided in. Further, the stand walls 47 of the one rail portions 45 are provided with a slit 49 capable of being passed through by the FFC.

The pair of rails 45 positions the circumference of the slit 42 of the wall surface 40a within each stand walls 47 and 48. Namely, the rail portions 45 position circumference of the slit 42 of the wall surface 40a in the protector body 40 inside, with circumference of the slit 42 of the wall surface 40a in the protector body 40 contacting the inside of the stand walls 47 and 48, and the slider 41 is attached to the protector body 40 slidably along the fore and aft direction of the vehicle, i.e., the sliding direction of the sunroof 3. The slider 41 in the configuration described above is attached to the protector body 40 and the slid portion 43 is accommodated therein with a remedying portion 46 positioned away from the sunroof 3 and with the hook portion 44 positioned near the sunroof 3.

Further, according to the embodiment, the FFC 17 is accommodated in the protector body 40 so that both one end portion 17a and the other end portion 17b thereof are located forward the vehicle, and central part thereof is located backward the vehicle. The one end portion 17a of the FFC 17 is stacked inside in the protector body 40 near the one of the rails 5a as shown in FIG. 12, and attached to the inside, and connected to the devices in the vehicle. The other end portion 17b of the FFC 17 is stacked inside in the protector body 40 near the roof panel 6 as shown in FIG. 12, and led to outside the protector body 40 through the slit 42 and 49.

Further, the one end portion 17a of the FFC 17 is stacked on the slider 41 between the slid portion 43 and hook portion 44, and attached to the slider 41 by winding a tape around the circumference, and connected to a photovoltaic panel 4 as a device of the sunroof 3 on the vehicle. Namely, the remedying portion 46 of the slider 41 is positioned within the one end portion 17a and the other end portion 17b of the FFC 17.

According to the embodiment, in the same manner as the first embodiment described above, since the hook portion 44 that is attached to the sunroof 3 is provided in the slider 41 slidably provided in the long-length shaped protector body 40 of the protector 15, the slider 41 of the protector 15 is not overlapped under the sunroof 3. Therefore, the thickness of the roof panel 6 as a panel of the roof portion 2 of the car body the sunroof 3 is attached to can be reduced.

Further, according to the embodiment, since the protector body 40 is formed in the tube shape with the slit 42, and the slid portion 43 of the slider 41 is positioned in the protector body 40, and the hook portion 44 is formed in the flat-plate shape passing through the slit 42, the protector body 40 and the slider 41 do not overlap each other in the thickness direction of the sunroof 3. Therefore, the thickness of the protector 15 can be reduced and a step can be prevented to be formed inside the protector body 40. The thickness of the panel the slide panel is attached to can be thus reduced. In addition, it is preventable the step would otherwise interfere with the wire harness and damage it described above.

According to the embodiment, the protector 15 includes the rail portions 45 positioning the circumference of the slit 42 of the wall surface 40a in the protector body 40 inside in contact and the slider 41 is slidably attached to the protector body 40 by the rail portions 45. Therefore, even when the slider 41 slides while being pushed or pulled by the gutter 9 attached to the sunroof 3, the slider 41 is guided by the rail portions 45. It is thus preventable the slider 41 is hooked to the protector body 40 not to slid. Therefore, the feeder apparatus 1 secures the sunroof 3 to slide.

There is provided a remedying portion which is arranged at an end portion away from the hook portion 44 of the slid portion 43 in the slider 41 with its thickness gradually increasing as separated from the hook portion 44, and of which the end surface is formed in the convex round shape, and which is positioned within both end portions 17a and 17b of the FFC 17. Therefore, the remedying portion 46 contacts the wire harness 14 inside the protector body 40 while the slider 41 slides. As a result, the remedying portion 46 remedies the wire harness 14 in the protector body 40 to prevent the wire harness 14 from twisting therein.

Although the present invention has been fully described by way of example with reference to the accompanying drawings, it is to be understood that various changes and modifications will be apparent to those skilled in the art. Therefore, unless otherwise such changes and modifications depart from the scope of the present invention hereafter defined, they should be construed as being included therein. In the invention, naturally, wire harness may be configured with a variety of electric cables other than the FFC 17.

What is claimed is:

1. A feeder apparatus for a slide panel comprising:
a wire harness routed between a car body and a slide panel slidably provided to the body, the slide panel operating to open and close an opening provided through the body; and a protector accommodating the wire harness, the protector comprising: an elongated housing member that is attached to the car body and extending parallel to a sliding direction of the slide panel, and accommodates one end portion of the wire harness; and a slide member having a slid portion slidably engaged with the housing portion along the sliding direction of the slide panel and an attachment portion the other end portion of the wire harness is attached to for attaching the slide member to the slide panel, the attachment portion being attached to the slide panel so as to slide together with the slide panel, and
a columnar member associated with the slide panel and arranged perpendicular the sliding direction of the slide panel, the attachment portion being hooked thereto.

2. The feeder apparatus for a slide panel as claimed in claim 1, wherein the housing member is gutter-shaped, and the slide member is gutter-shaped such that the slid portion accommodates the other end portion of the wire harness, and openings in cross section of the housing member and the slid portion are arranged oppositely along the surface of the slide panel.

3. The feeder apparatus for a slide panel as claimed in claim 1, wherein the protector further comprises: rail portions provided in the slid portion of the slide member, the rail portions extending along the sliding direction of the slide panel; and a slider portion provided in the housing member, the slider portion being positioned inside the rail portions with the inside of the rail portions in contact therewith.

4. The feeder apparatus for slide panel as claimed in claim 1, wherein the housing member is tube-shaped with a slit extending along the sliding direction of the slide panel, and the slid portion of the slide member is accommodated in the housing member, and the attachment portion is positioned outside the housing member through the slit and formed in the flat-board shape.

5. The feeder apparatus for a slide panel as claimed in claim 4, wherein the protector further comprises: a rail portion provided between the slid portion of the slide member and the attachment portion, the rail portion including two stand walls which are positioned on opposite sides of the slit of the housing member.

6. The feeder apparatus for slide panel as claimed in claim 4, wherein the protector further comprises: a remedying portion arranged at an end portion away from the attachment portion of the slid portion with thickness thereof gradually increasing as separated from the attachment portion, a surface of the remedying portion away from the attachment portion being formed in a convex round shape.

* * * * *